(12) United States Patent
Creed et al.

(10) Patent No.: US 8,419,512 B2
(45) Date of Patent: Apr. 16, 2013

(54) VEHICLE CABIN HEATING COOLING AND VENTILATION SYSTEM

(75) Inventors: John L. Creed, Niles, OH (US); Steven G. Skinner, Willoughby, OH (US)

(73) Assignee: HDT Tactical Systems, Inc., Solon, OH (US)

( * ) Notice: Subject to any disclaimer, the term of this patent is extended or adjusted under 35 U.S.C. 154(b) by 1423 days.

(21) Appl. No.: 11/973,466

(22) Filed: Oct. 9, 2007

(65) Prior Publication Data

US 2008/0085672 A1 Apr. 10, 2008

Related U.S. Application Data

(60) Provisional application No. 60/850,441, filed on Oct. 10, 2006.

(51) Int. Cl.
*H01M 10/50* (2006.01)

(52) U.S. Cl.
USPC .......................................................... 454/139

(58) Field of Classification Search ................... 454/139
See application file for complete search history.

(56) References Cited

U.S. PATENT DOCUMENTS

| | | | |
|---|---|---|---|
| 4,526,013 A | 7/1985 | Joy | |
| 4,616,484 A | 10/1986 | Mehdi et al. | |
| 5,151,022 A | 9/1992 | Emerson et al. | |
| 5,975,081 A | 11/1999 | Hood et al. | |
| 6,402,812 B1 | 6/2002 | Perrotta et al. | |
| 6,422,308 B1 * | 7/2002 | Okawara et al. | 165/202 |
| 6,488,029 B1 | 12/2002 | Toth et al. | |
| 6,862,892 B1 | 3/2005 | Meyer et al. | |
| 6,889,762 B2 | 5/2005 | Zeigler et al. | |
| 6,899,403 B2 | 5/2005 | Isono et al. | |
| 6,915,656 B2 | 7/2005 | Ratliff | |
| 6,935,421 B2 * | 8/2005 | Takeuchi et al. | 165/202 |
| 2006/0005941 A1 * | 1/2006 | Watanabe et al. | 165/41 |
| 2006/0130505 A1 * | 6/2006 | Plummer | 62/236 |
| 2008/0161974 A1 | 7/2008 | Alston | |

OTHER PUBLICATIONS http://www.vnis.com/story.cfm?textnewsid=1791, Veteran News: Soldiers Testing Cooling Vests in Iraq, Oct. 8, 2007, 2 pages.
http://igargoyle.com/archives/2005/12/armys_cooling_v.html, igargoyle: Army's Coiling Vests, Jan. 6, 2006, 2 pages.
http://refrigerants.dupont.com/Suva/en_US/products/suva134a.html, DuPont Refrigerants—Suva® 134a, Oct. 8, 2007, 2 pages.
http://www.doucetteindustries.com/coaxial.html, Doucette: Coaxial Coil Heat Exchangers, Oct. 8, 2007, 2 pages.

* cited by examiner

*Primary Examiner* — Steven B McAllister
*Assistant Examiner* — Samantha Miller
(74) *Attorney, Agent, or Firm* — Fay Sharpe LLP

(57) ABSTRACT

An air treatment system for a vehicle includes a first compressor selectively coupled to a first power source of the vehicle. A second compressor is selectively coupled to a second power source of the vehicle. A first heat exchanger communicating with an interior space is defined in the vehicle. A second heat exchanger communicates with an environment exterior to the vehicle. A valve member is provided which, in a first position, couples an inlet of each of the first and second compressors to an outlet of the first heat exchanger and an outlet of each of the first and second compressors to an inlet of the second heat exchanger. In a second position, the valve member couples the outlets of the first and second compressors to an inlet of the first heat exchanger and the inlets of each of the first and second compressors to an outlet of the second heat exchanger. A controller is provided that selectively actuates at least one of the first and second compressors and the valve member.

24 Claims, 9 Drawing Sheets

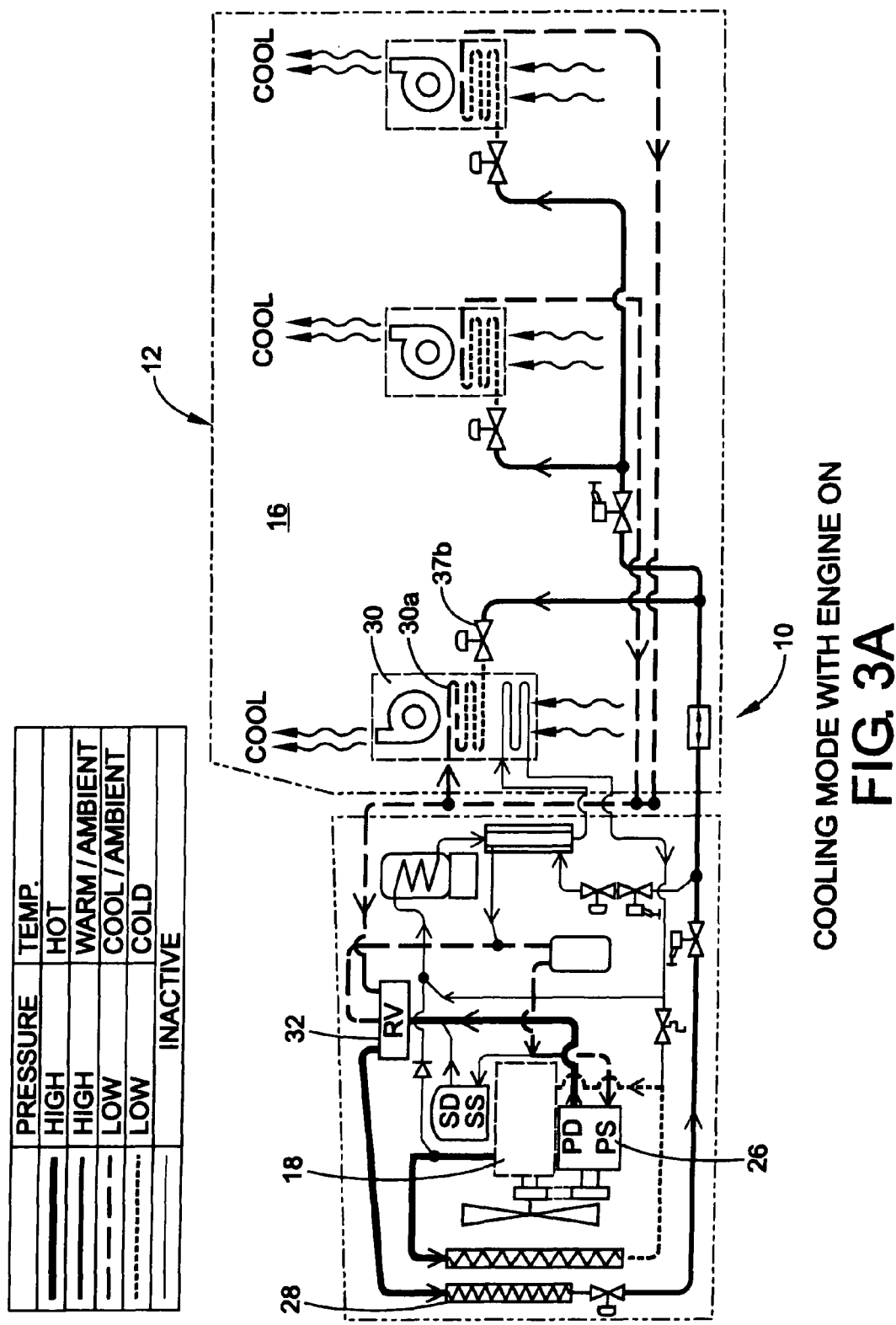
FIG. 3A COOLING MODE WITH ENGINE ON

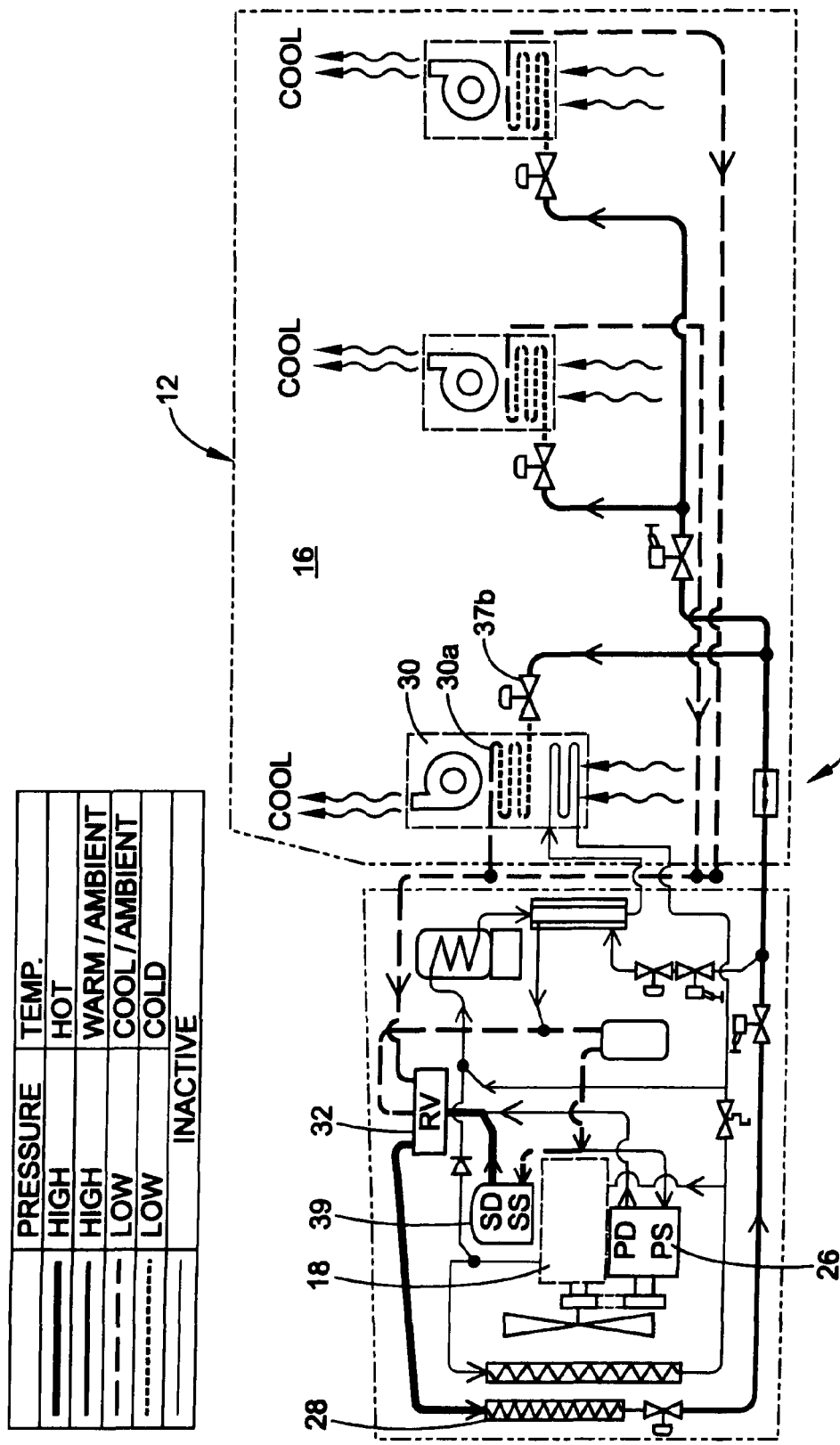
FIG. 3B COOLING MODE WITH ENGINE OFF

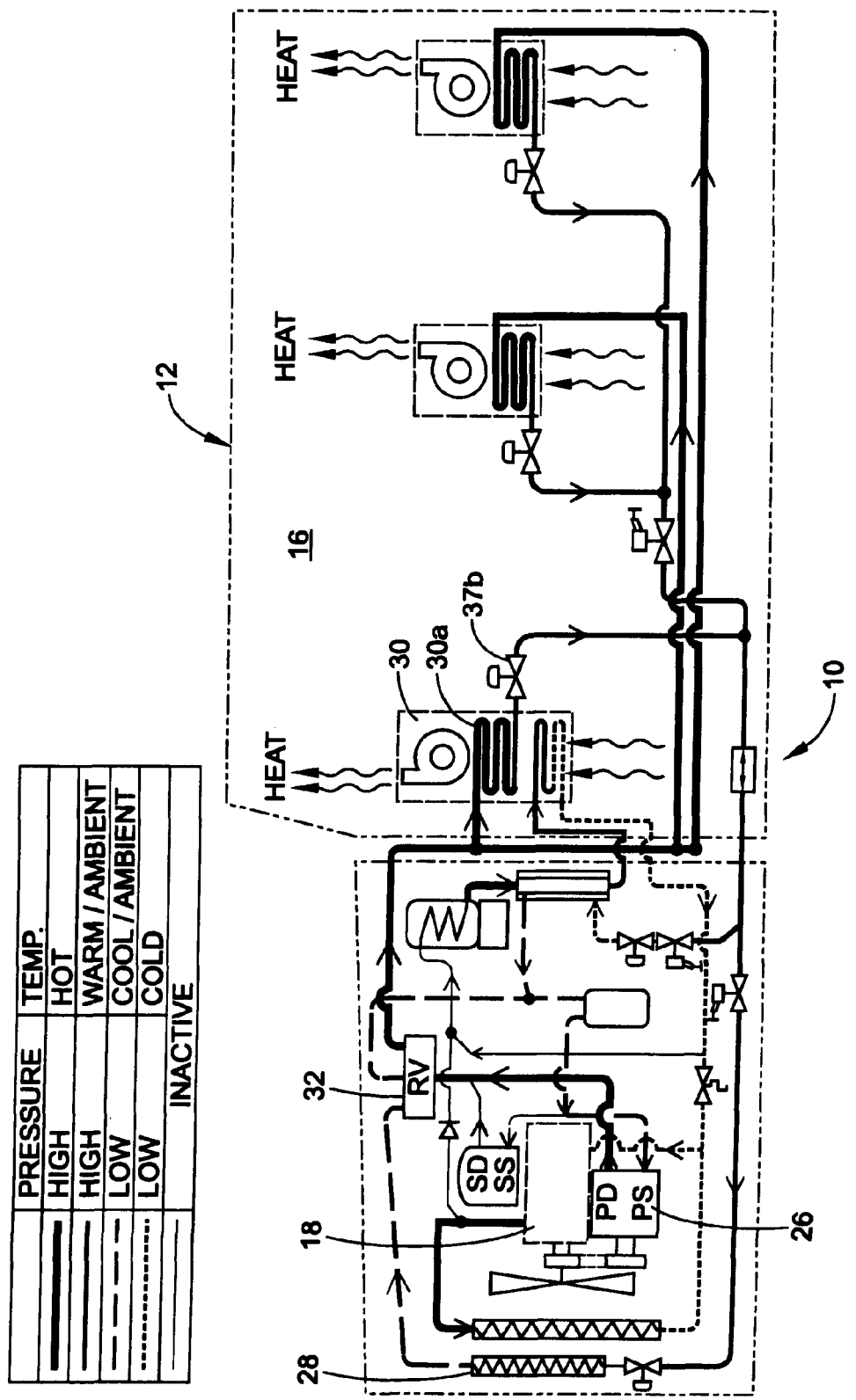
FIG. 4A  HEATING MODE WITH ENGINE ON, AMBIENT > 40°F

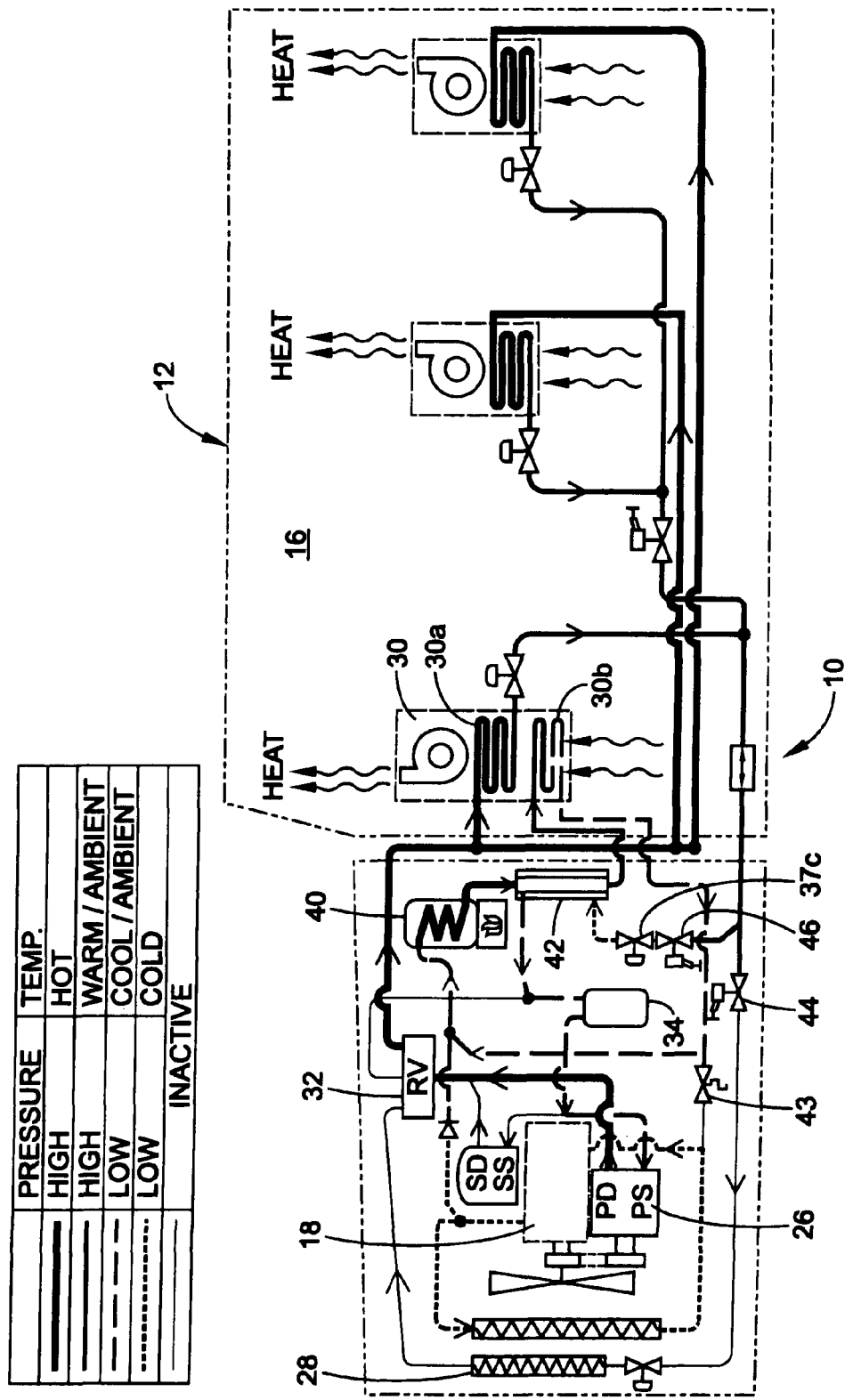
FIG. 4B HEATING MODE WITH ENGINE ON, AMBIENT -40° F

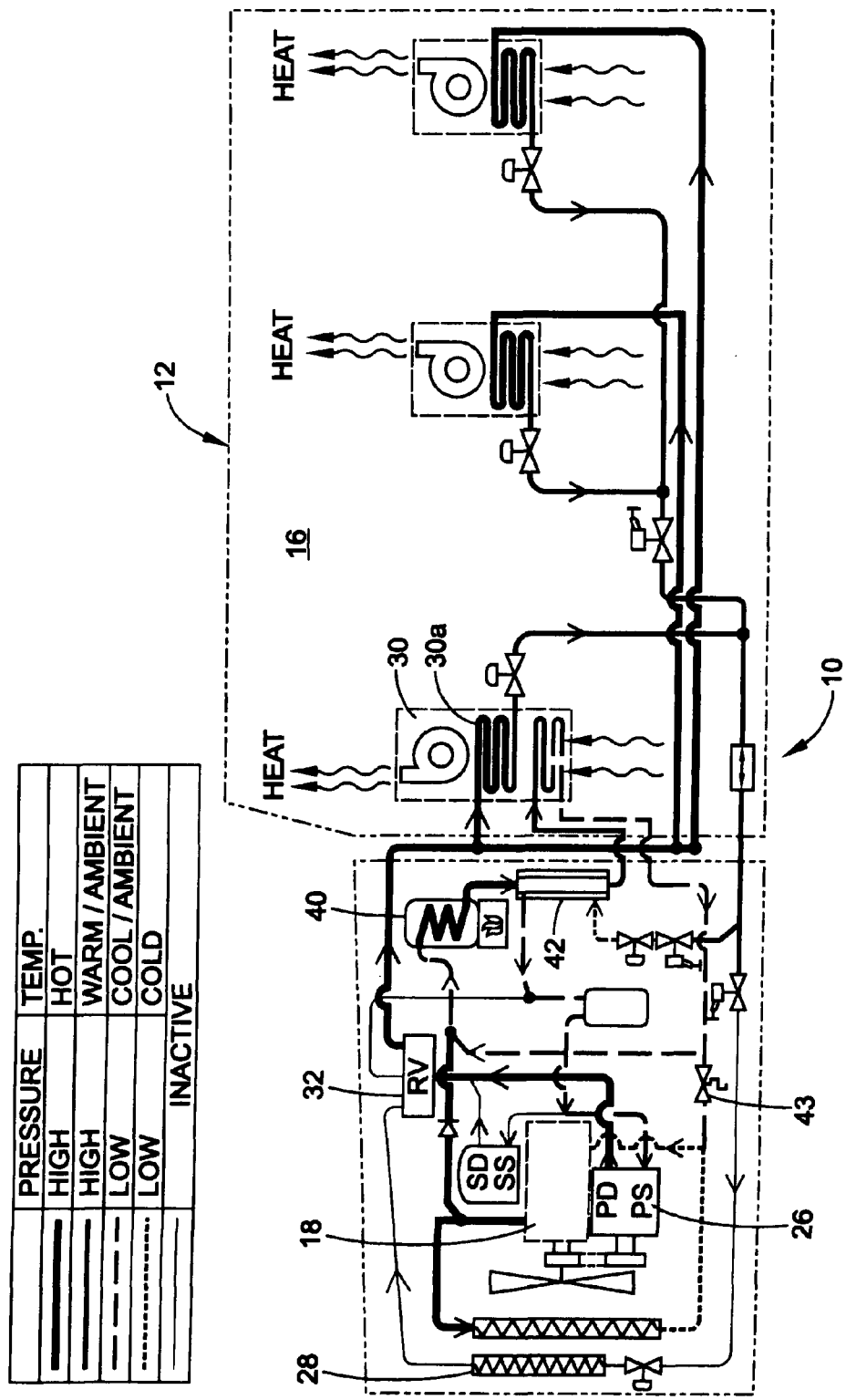
FIG. 4C  HEATING MODE WITH ENGINE ON, COOLANT EXIT TEMP < 80° F

HEATING MODE WITH ENGINE OFF

VEHICLE CABIN HEATING COOLING AND VENTILATION SYSTEM

This application claims the benefit of U.S. Provisional Application Ser. No. 60/850,441 which was filed on Oct. 10, 2006.

FIELD OF THE INVENTION

The present invention relates to the field of tactical and non-tactical vehicle cabin heating, nuclear chemical and biological (NBC) filtered and unfiltered air ventilation, and cooling systems. In particular, the present invention relates to systems intended to heat, cool, ventilate, or over pressurize the interior or crew compartment of a vehicle.

BACKGROUND OF THE INVENTION

The global war on terror has presented the military with new challenges. One such challenge is the redesign of combat vehicles to safely carry personnel and or cargo. One of the most important requirements for a combat vehicle's protection is counter mine design. These new mine/IED protected vehicles and armored fighting vehicles are designed for anti-personnel or larger anti-tank mines, armor penetrating and self-forged fragmented mines as well as improvised explosive devices (IEDs). To provide maximum protection new vehicles use special lower frame V shapes to deflect a mine blast with increased armor and clear armor windows for blast and bullet defense. Engines and transmissions are also housed within armor. The only outside openings that can be safely opened are the firing ports located in the doors and side panels. This added ballistic protection of the engine, transmission, and crew compartment has increased the cabin thermal load and mass thereby substantially increasing the load on the heating, cooling, and ventilation of the crew compartment.

Present tactical and non tactical vehicle heating and air conditioning systems use two independent engine driven heat transfer fluid systems in order to heat or cool the interior or cabin environment of a vehicle. Typically, in order to heat the interior, heated engine coolant is circulated from the engine through a liquid-to-air type heat exchanger located in or near the interior of the vehicle. In order to cool the interior, an engine driven compressor is typically used to compress a refrigerant. The condensed refrigerant is then allowed to pass through a refrigerant-to-air type heat exchanger (e.g. an evaporator coil) also located in or near the interior. In addition, present vehicle air ventilation systems may draw filtered or unfiltered air from the ambient environment.

There are several disadvantages in using such engine driven independent systems for the heating and cooling of a vehicle interior. First, using separate heating and cooling systems requires the use of twice as many fluid conduits and heat exchangers. In other words these independent systems typically include one set of fluid conduits and an interior heat exchanger for heating and one set of fluid conduits and an interior heat exchanger for cooling. Having two sets of fluid lines and heat exchangers not only incurs additional expense in the manufacture of the vehicle, but also contributes to the overall vehicle weight and consumption of valuable cabin space. This is particularly the case in larger transport vehicles that have multiple heat exchangers in the interior. For example, extended cab vehicles, large passenger vans, and military tactical vehicles typically include two in-dash heat exchangers, two mid-cabin heat exchangers, and two rear cabin heat exchangers. The two heat exchangers are normally packaged together with a common blower in order to effectively and adequately heat or cool the entire interior. In some applications a large single interior heat exchanger is used while a high CFM blower forces the treated air via ductwork to multiple locations throughout the interior. This ductwork consumes additional interior cabin space, requires the use of insulation, and must be sufficiently rigid so that it does not collapse or bend during the loading or unloading of personnel and cargo. It can be seen that cost, weight, and space are all important concerns.

Yet another disadvantage of the conventional heating, cooling, ventilation system is that the engine of the vehicle must be running in order to produce heat. Furthermore, there is usually some delay in the production of heat under cold weather starting conditions. Under these conditions, the engine must first warm the engine coolant to an operating temperature that is high enough (usually 150-210 deg F.) to produce heated interior airflow from a coolant water to air heat exchanger. This delay in heat production can be inconvenient for the driver and passengers in the cabin. Besides heating the vehicle interior, the front windshield may also need to be heated or defrosted before the vehicle can be driven. In such cases, waiting for the engine to sufficiently warm to defrost the front windshield can increase the time needed before the vehicle can be driven Yet another disadvantage of a conventional heating, cooling, ventilation system is that the engine must be running to provide the mechanical rotational energy for air conditioning compressor and engine water pump rotation. During times of loitering or silent watch, personnel may remain inside the vehicle for safety and for protection against the outdoor environment. When loitering or under silent watch, it is generally preferred that the engine be shut off. This loss of engine rotational energy for air conditioning and engine water pump operation stops interior heating, cooling and ventilation. During cold weather operation the interior can become as cold as the surrounding ambient. Cold weather clothing can help retain body heat but wearing such clothing is both cumbersome and restrictive. Therefore, lack of heat when the engine is off can also be a problem.

In cold weather conditions, the interior vehicle temperature will rarely if ever be lower than the exterior ambient temperature. On the other hand, during hot weather conditions, the interior vehicle temperature can significantly exceed exterior ambient temperatures. The exterior color of the vehicle, solar radiation entering through the windows of the vehicle, and additional heat load from the surrounding ground (radiating under and around the vehicle) all contribute to the temperature rise inside the vehicle. In many instances personnel are unable to remove protective clothing to aid in reducing body temperature. As a result, the interior vehicle temperature can become extreme within minutes. Prolonged exposure to elevated temperatures can cause physical stress that ultimately impairs the ability of personnel to perform.

Yet another disadvantage of present conventional heating, cooling, ventilation systems is that fresh air filtration systems provide limited protection from harmful gasses and biological contaminants. In many cases carbon based filters and particulate filters are undersized for ease of integration and to keep consumer costs low, and thus only limited protection is provided. In addition, airflow density and velocity through the filters is not managed thus producing off gassing and reducing overall capacity.

Yet another disadvantage of present conventional heating, cooling, and ventilation systems, particularly for military vehicles, is the use of externally mounted Nuclear, Biological, and Chemical (NBC) filtration systems. These filtration systems are intended to slightly over pressurize the vehicle interior. Current state of the art NBC filtration systems are self-contained and mounted outside of the vehicle. This approach exposes the ventilation over pressurization system to heat and cold, increasing the load on the vehicle heating and cooling system. In addition, an exterior mounted system is outside of standard vehicle protective armor and may require additional shielding or armor for protection. This further contributes to vehicle weight, time required to service the system, and mounting complexity. Another disadvantage of an exterior mounted system is that it provides additional surfaces where weapons such as hand grenades could become stuck or lodged.

Yet another disadvantage of the conventional heating, cooling, ventilation system is that vehicle NBC ventilation over pressurization systems regulate the interior pressure of the vehicle by increasing or decreasing the over pressurizing air flow. These systems do not monitor the density or velocity of the air moving through an NBC filter system. As such, the particulate and vapor adsorbing ability of the filter system can be greatly reduced.

Yet another disadvantage of the conventional heating, cooling, ventilation system is the introduction into the vehicle interior of external filtered over pressurization air. Current systems introduce the filtered airflow directly into the interior or into the recirculation airflow of the heater/air conditioner. The method of mixing the ambient filtered air flow before passing the ambient air through a heat exchanger is less efficient than introducing the ambient air directly to the heat exchanger.

Yet another disadvantage of the conventional heating, cooling, and ventilation system is the lack of airflow control for use with a military personnel cooling vest. During cooling vest operation, air flow from the heating, cooling, and ventilation system is used to provide heat transfer from a cooling vest heat exchanger to the fluid inside of the vest. The lack of a conditioned airflow control can impede the efficient operation of the cooling vest. As with a high interior vehicle temperature, insufficient vest cooling can cause physical stress that ultimately impairs the ability of personnel to perform.

For at least these reasons there is a need to provide a heating, cooling and ventilation system for a vehicle interior that is compact, effective, and concealed by protective armor (for military vehicles) while providing occupant comfort and safety during both engine on and off conditions. The present invention therefore relates to an improved design for a heating, cooling and ventilation system for a vehicle interior.

SUMMARY OF THE INVENTION

The invention may take form in certain structures and components, several embodiments of which will be described in detail in this specification and illustrated in the accompanying drawings. In the drawings:

According to one aspect of the present invention, a heating, cooling, and ventilation system for an associated vehicle is provided. The associated vehicle includes a body and an engine. The body includes a cabin defining an interior portion of the associated vehicle. The system includes a first refrigerant compressor selectively coupled to a shaft of the engine of the associated vehicle. The first compressor includes an inlet and an outlet. A second refrigerant compressor is selectively connected to an electrical power source of the associated vehicle. The second compressor includes an inlet and an outlet. A first refrigerant-to-air heat exchanger (RTAX) is provided in fluid communication with air in the interior portion of the associated vehicle. A second RTAX is secured to the body of the associated vehicle and is in fluid communication with air exterior to the cabin of the associated vehicle. A valve member includes a cooling position and heating position. The valve member operatively connects the inlets of the first and second compressors to a refrigerant outlet of the first RTAX while connecting the outlets of the first and second compressors to a refrigerant inlet of the second RTAX when the valve member is in the cooling position. The valve member operatively connects the outlets of the first and second compressors to a refrigerant inlet of the first RTAX while connecting the inlets of the first and second compressors to a refrigerant outlet of the second RTAX when the valve member is in the heating position. A blower is mounted to the associated vehicle and is configured to move air through the first RTAX. A controller is provided capable of selectively activating one or more of the first compressor and the second compressor while placing the valve member into one of the cooling position and the heating position, based upon one or more system inputs.

According to another aspect of the present invention, a method of heating, cooling, and ventilating air in a cabin of a vehicle is provided. The cabin defines an interior portion of the vehicle. The method includes providing a heating, cooling, and ventilation system including a first refrigerant compressor selectively coupled to a first power source. A second refrigerant compressor is provided selectively coupled to a second power source. A first refrigerant-to-air heat exchanger (RTAX) is provided in fluid communication with air in the cabin of the vehicle and a second RTAX in fluid communication with air exterior to the cabin of the vehicle. The first and second RTAX are in fluid communication with the first and second compressors and a refrigerant valve member. The valve member including a cooling position and heating position. A controller is provided in electrical communication with the first and second compressors, the valve member, and one or more system inputs. At least one of the first and second compressors is activated via the controller. Air in the cabin is heated when the controller biases the valve member into the heating position, compressing and condensing a refrigerant in the first RTAX while evaporating the refrigerant in the second RTAX and moving air in the cabin through the first RTAX. Air in the cabin is cooled when the controller biases the valve member into the cooling position, compressing and condensing the refrigerant in the second RTAX while evaporating the refrigerant in the first RTAX, and moving air in the cabin through the first RTAX. At least one of the first compressor and the second compressor is cycled and a temperature of the air in the cabin regulated via the controller based on one or more system inputs.

According to yet another aspect of the present invention, an air treatment system for a vehicle includes a first compressor selectively coupled to a first power source of the vehicle. A second compressor is selectively coupled to a second power source of the vehicle. A first heat exchanger communicating with an interior space is defined in the vehicle. A second heat exchanger communicates with an environment exterior to the vehicle. A valve member is provided which, in a first position, couples an inlet of each of the first and second compressors to an outlet of the first heat exchanger and an outlet of each of the first and second compressors to an inlet of the second heat exchanger. In a second position, the valve member couples the outlets of the first and second compressors to an inlet of the first heat exchanger and the inlets of each of the first and second compressors to an outlet of the second heat exchanger. A controller is provided that selectively actuates at least one of the first and second compressors and the valve member.

According to still yet another aspect of the present invention, an air treatment system for a vehicle includes a refrigerant compressor selectively coupled to a first power source of the vehicle. A first heat exchanger communicates with an interior space defined in the vehicle. A second heat exchanger communicates with an environment exterior to the vehicle. A valve assembly is provided. In a first setting, the valve assembly couples an inlet of the refrigerant compressor to an outlet of the first heat exchanger and an outlet of the refrigerant compressor to an inlet of the second heat exchanger. In a second setting, the valve assembly couples the outlet of the refrigerant compressor to an inlet of the first heat exchanger and the inlet of the refrigerant compressor to an outlet of the second heat exchanger. A nuclear-biological-chemical (NBC) filtration unit is secured to the vehicle. The unit includes a blower, an inlet in fluid communication with air exterior to the vehicle, and an outlet in fluid communication with air in the interior space of the vehicle.

BRIEF DESCRIPTION OF THE DRAWINGS

The invention may take form in certain structures and components, several embodiments of which will be described in detail in this specification and illustrated in the accompanying drawings. In the drawings:

FIG. 3A is a schematic view of FIG. 1 illustrating the VIHCV system operating in a cooling mode with a vehicle engine running.

FIG. 3B is a schematic view of FIG. 1 illustrating the VIHCV system operating in the cooling mode with the vehicle engine off.

FIG. 4A is a schematic view of FIG. 1 illustrating the VIHCV system operating in a heating mode with the vehicle engine running in ambient conditions greater than 40° F.

FIG. 4B is a schematic view of FIG. 1 illustrating the VIHCV system operating in the heating mode with the vehicle engine running in ambient conditions at or around −40° F.

FIG. 4C is a schematic view of FIG. 1 illustrating the VIHCV system operating in the heating mode with the vehicle engine running in while the engine coolant exit temperature is less than 80° F.

DETAILED DESCRIPTION

Figure 1:
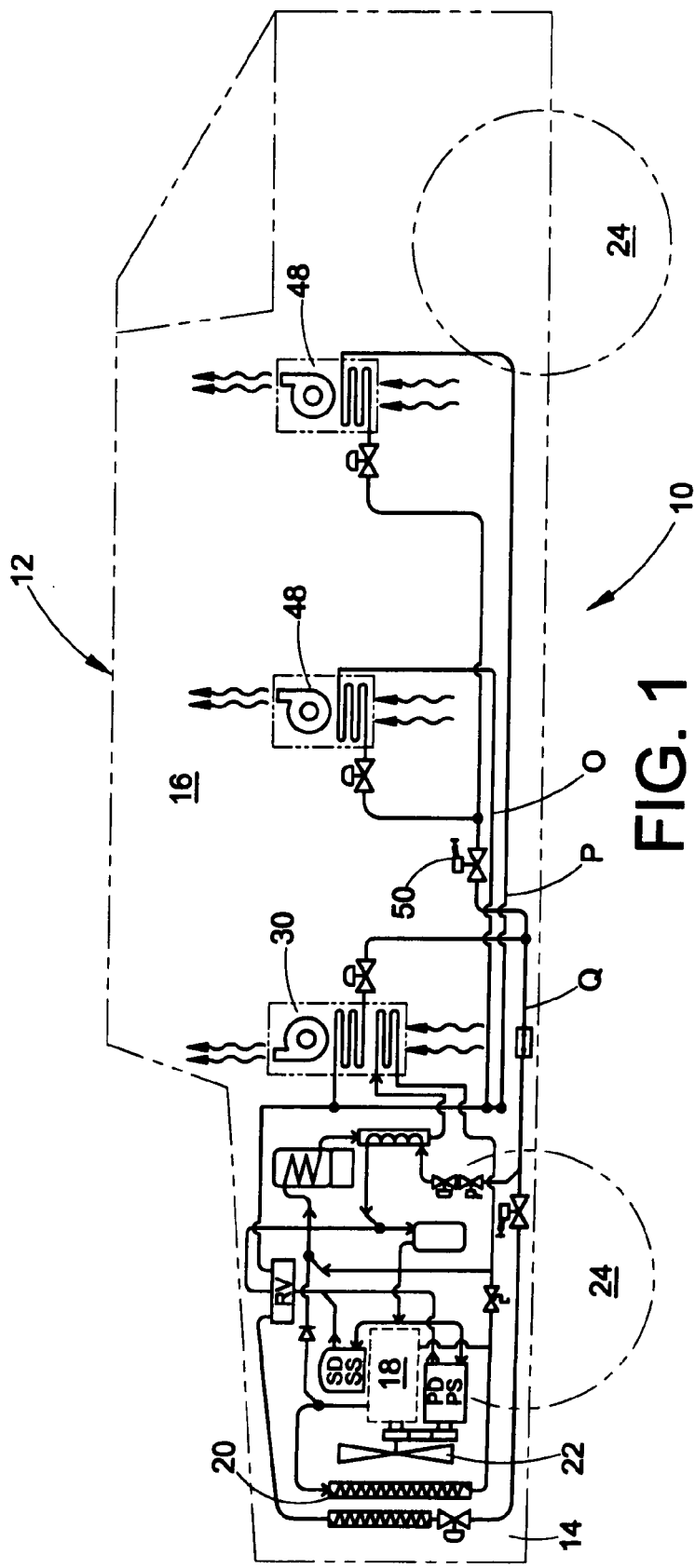
FIG. 1 is a schematic view of a first embodiment of a vehicle interior heating, cooling, and ventilation (VIHCV) system according to the present invention.
Figure 2:
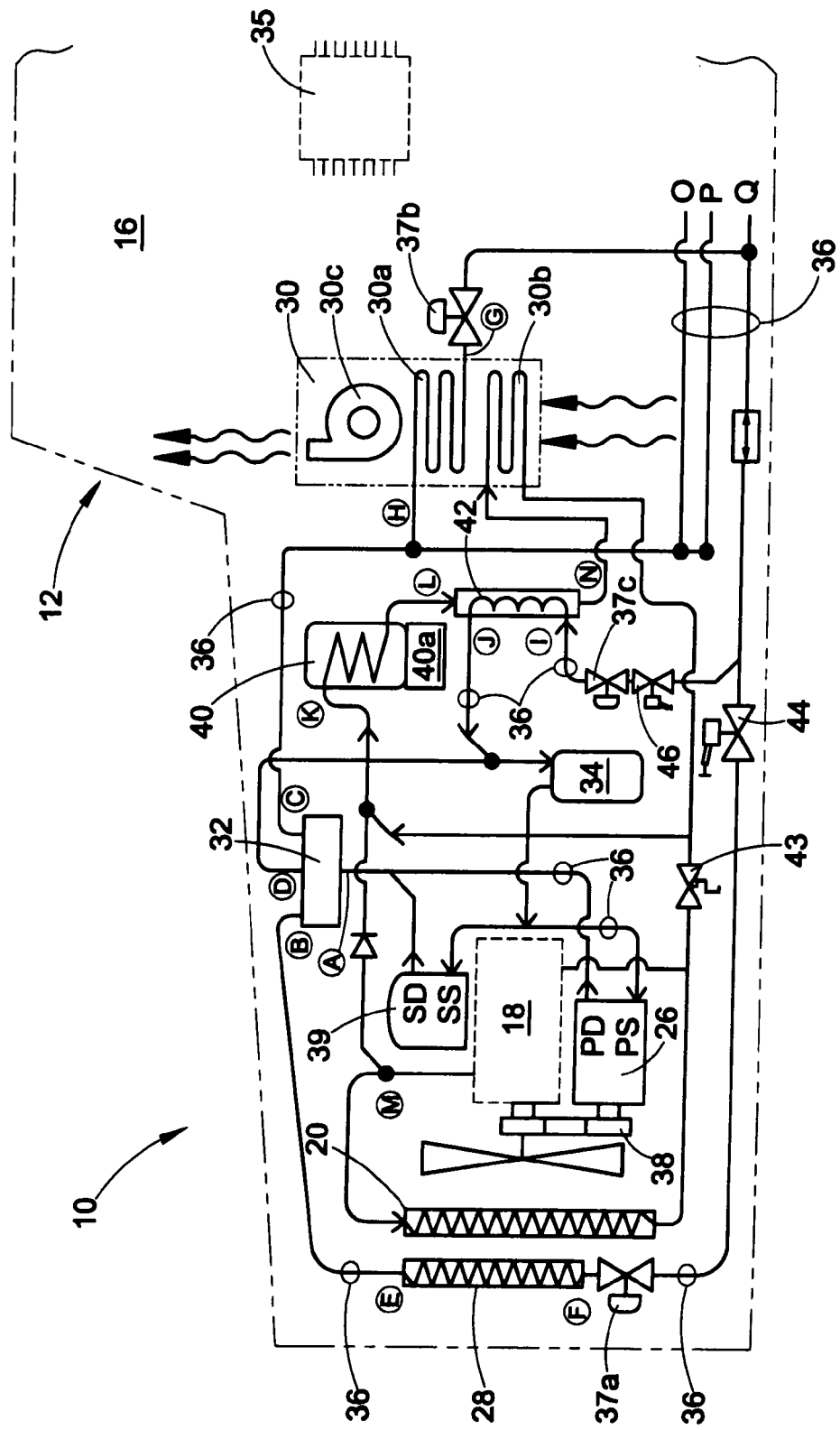
FIG. 2 is an enlarged view of a forward portion of FIG. 1 more clearly illustrating the VIHCV system.

With reference to FIGS. 1 and 2, a first embodiment of a vehicle interior heating, cooling, and ventilation system (VIHCV) 10 is shown. Generally, the VIHCV system 10 is intended to be installed in a vehicle 12. The vehicle 12 may be used for the transportation of military personnel, civilians and/or cargo. In addition, the vehicle 12 may be configured as a fighting vehicle intended for tactical or combat missions. Even still, the vehicle 12 could be an electric, hybrid electric (HEV), or alternative fuel driven vehicle. Typically, the vehicle 12 includes an engine compartment 14, an interior or cabin 16, an engine or other prime mover 18, a radiator 20, a radiator fan 22 and a set of wheels 24. Also, a pressurized Nuclear, Biological, and Chemical (NBC) air filtration system 25 (FIG. 5) is supplied for collective protection providing over pressurization of the interior of the vehicle.

With reference now to FIG. 2, the VIHCV system 10 generally includes a first or primary compressor 26, an exterior heat exchanger 28, a first or primary interior air handler or heat exchanger unit 30, a reversible flow valve 32 or other flow switching means, a suction line accumulator 34 and a series of refrigerant lines 36. The primary compressor 26 may be of a fixed displacement type or of a variable displacement type. Having a variable displacement compressor may be preferred to more efficiently manage the heating or cooling needs of the vehicle cabin, while rotating the compressor at a fixed speed. This may be preferred if the engine 18 of the vehicle 12 will remain idling or at high speed for extended periods of time.

Figure 5:
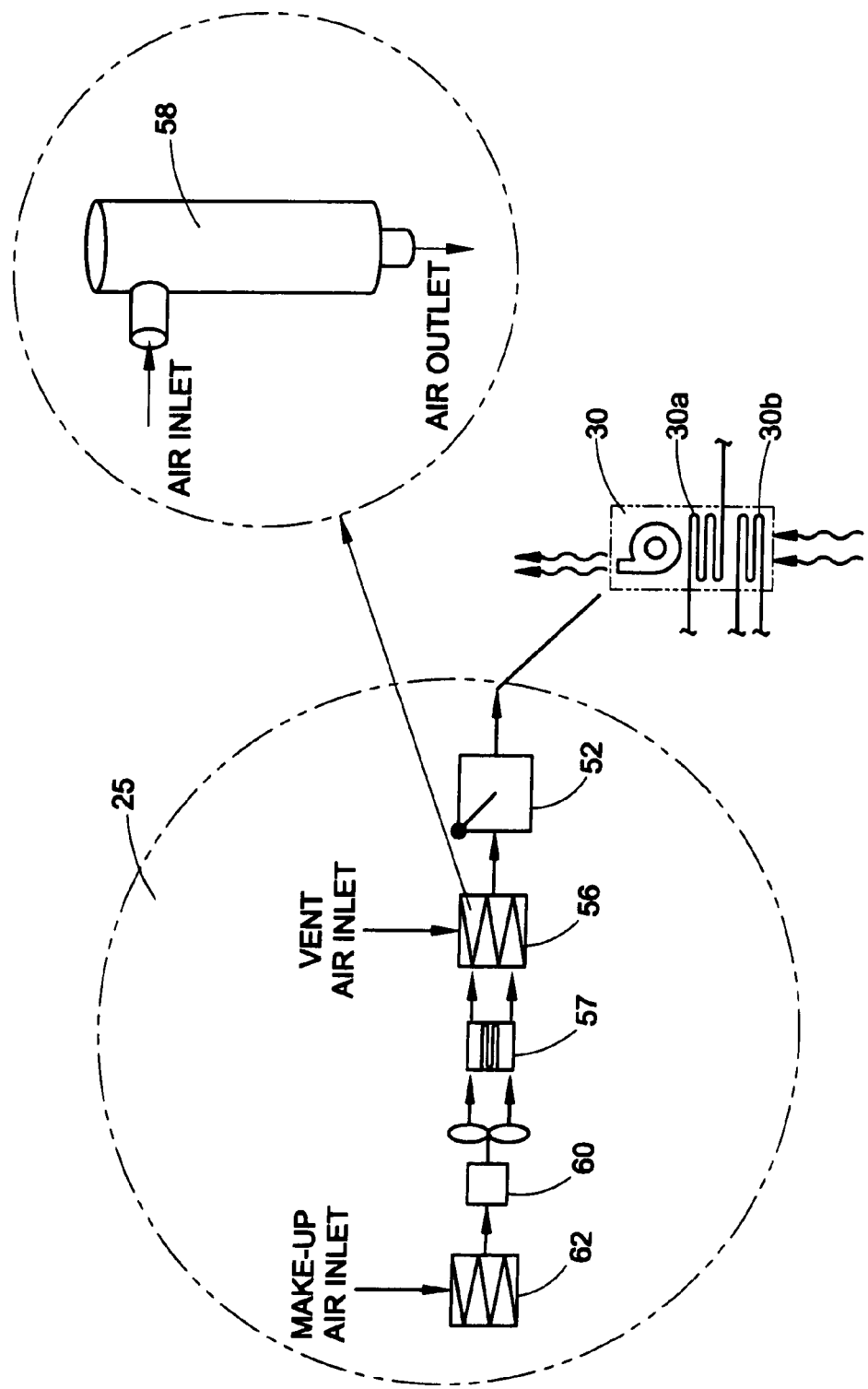
FIG. 5 is a schematic view of a Nuclear, Biological, and Chemical (NBC) filtration unit of the VIHCV system.

As shown in FIG. 2, the primary interior heat exchanger unit 30 includes a refrigerant-to-air (RTA) type heat exchanger 30a, a water-to-air (WTA) heat exchanger 30b and a blower 30c. The primary interior heat exchanger unit 30 and exterior heat exchanger 28 (shown in FIG. 2) are common in under dash automotive applications. Although, the WTA heat exchanger 30b is shown in the disclosed embodiment of the VIHCV system 10, it could be eliminated in various other contemplated embodiments. A conduit of metal or hose may be provided to communicate with the output airflow of the NBC filtration system 25 (FIG. 5). In addition, a non-filtered fresh air inlet with a damper door is provided in the pressurized air stream between the NBC filtration system 25 (FIG. 5) and the primary interior heat exchanger unit 30. Depending on the application and nature of the vehicle, the heat exchangers may be made of thicker gauge tubing and include a shock absorbent layer to make the exchangers more puncture and leak resistant.

A fin and tube, micro channel, fin and plate or any other state of the art coil design can be used for the heat exchangers. In particular, the coil designs of the exterior heat exchangers and interior heat exchangers may incorporate wide fin spacing to allow dust and dirt to pass through. The working fluid for the present invention can be any type of known refrigerant suitable for heating and cooling applications. For example, SUVA® Hydro fluorocarbon (HFC) 134a manufactured by the Dupont Company, is a commonly used refrigerant.

The VIHCV system 10 includes various operating or climate control strategies for when the system is running in either a cooling mode or a heating mode. By way of example, each of FIGS. 3A-3B illustrate a control strategy, where the system 10 is operating in the cooling mode. Similarly, each of FIGS. 4A-4D illustrate a control strategy where the system 10, is operating in the heating mode. In addition, the VIHCV system 10 includes two modes of ventilation air flow, NBC filtered and non-filtered. A dust filter element or a centrifugal dust separator or other mechanical separator can be integrated to the non NBC filtered ventilation inlet air flow when used in desert or dusty conditions. When the system 10 is operating in the cooling mode, heat is transferred or "pumped" from the interior 16 of the vehicle 12 to the outside. The primary difference between the cooling mode and the heating mode of the system 10 is based upon the direction in which the refrigerant is flowing. Generally, if the refrigerant is being compressed or condensed in or toward the exterior heat exchanger 28, then the system 10 is operating in the cooling mode. On the other hand, if the refrigerant is being compressed or condensed in or toward the interior heat exchanger of the vehicle 30a, then the system 10 is operating in the heating mode. Compressing the refrigerant causes it to condense and, as the refrigerant undergoes this phase change, heat is produced. Conversely, expanding the refrigerant causes it to evaporate thereby absorbing heat.

The reversible flow valve serves to change or reverse the direction of flow of the refrigerant as between the interior and exterior heat exchangers 28,30a, thus placing the system in either the heating mode or the cooling mode. With reference to FIG. 2, the reversible flow valve 32 may include four ports A-D. When the reversible flow valve 32 is in a cooling position, a first port A and a second port B are in fluid communication while a third port C and a fourth port D are in fluid communication. On the other hand, when the reversible flow valve 32 is in a heating position, the first port A and the third port C are in fluid communication while the second port B and the fourth port D are in fluid communication. The reversible flow valve 32 may be urged into either the cooling or heating positions, through the use of an electromagnetic solenoid device, such that when current is applied, the valve is held in one position or the other. When power to the valve is off, it may be biased into the opposite position, for example, through the use of a spring or system pressure. A control signal for controlling the heating or cooling operation of the system 10 may originate from a vehicle environment controller 35, a controller area network buss, or other switching or control device located within the vehicle 12. Of course, rather than using a self-contained reversible flow valve, a number of separate valves could be connected and actuated in such a manner as to create the same flow reversing effect.

With continued reference to FIG. 2, the primary compressor 26 draws refrigerant through a primary suction port PS from the accumulator 34 and pumps it out a primary discharge port PD. The accumulator 34 serves as a reservoir and settling tank for the refrigerant that flows back from the heat exchangers. Because the refrigerant undergoes a phase change from the liquid state to the vapor state every time it cycles through the system 10, it is possible that the refrigerant upon completing the cycle will contain entrained vapor bubbles. Typically, entrained vapor inhibits compressibility and can lead to damage or rapid wear-out of a compressor. The accumulator 34 will allow entrained vapor to settle out from the liquid refrigerant. After the refrigerant is pumped out of the discharge port PD of the primary compressor 26, it then flows to the reversible flow valve 32 into the first port A. When in the cooling mode, the refrigerant is routed to the second port B which eventually travels toward the exterior heat exchanger 28. The exterior heat exchanger 28 includes two fluid ports, a first port E and a second port F. During cooling, compressed refrigerant flows into the first port E of the heat exchanger 28 dissipating heat and eventually flowing out the second port F. Adjacent to and in fluid communication with the second port F, is a first throttling or expansion member 37a. In general, a throttling or expansion member is typically used to provide some resistance or intermittent occlusion, to allow the compressor in a refrigerant-based system to build pressure. The throttling member may involve the use of an electrically or mechanically controlled valve, check valve, solenoid, or other selectively restrictive device. In the instant embodiment, the first throttling member 37a offers no restriction when operated in reverse flow (cooling mode), allowing the exterior heat exchanger 28 to act as a condenser.

As the primary compressor 26 pushes the refrigerant vapor through the discharge port PD and towards the exterior heat exchanger 28, the pressure and temperature of the refrigerant will rise. After flowing through the exterior heat exchanger 28, chilled, yet high pressure refrigerant flows towards the RTA heat exchanger 30a. In addition, a second throttling member 37b can be located at a first port G of the interior RTA heat exchanger 30a in the primary interior heat exchanger unit 30. In the cooling mode, the second throttling member 37b at the first port G remains at least partially occluded until the temperature or pressure reaches a first threshold. Once the first threshold is met, the second throttling member 37b opens allowing the refrigerant to flow and extract the maximum amount of heat from the interior or cabin 16. A third additional throttling member 37c is also illustrated in FIG. 2 which will be discussed in greater detail below.

Still with reference to FIG. 2, as heat is transferred within the interior heat exchanger unit 30 while in the cooling mode, the refrigerant flows through a second port H of the interior RTA heat exchanger 30a and towards the third port C of the reversible flow valve 32. Upon entering the reversible flow valve 32, the refrigerant is routed from the third port C to the fourth port D and back to the accumulator 34 where it is allowed to coalesce and once again be drawn out by the primary compressor 26. This cycle continues indefinitely, until the desired temperature of the cabin 16 is reached.

When the VIHCV system 10 is operating in the heating mode, the reversible flow valve 32 or flow switching means is in a position opposite of the cooling mode position. As in the cooling mode, the primary compressor 26 pumps refrigerant through the discharge port PD and towards the first port A of the reversible flow valve 32. However, instead of the refrigerant flowing from the first port A to the second port B, it now, instead, flows from the first port A to the third port C. The refrigerant now travels from the third port C to the second port H of the interior RTA heat exchanger 30a and through the primary interior heat exchanger unit 30. The RTA heat exchanger 30a now acts as a condenser rather than an evaporator. As the refrigerant flows through the RTA heat exchanger 30a, the refrigerant has no restriction due to the reverse flow through the second throttling member 37b located adjacent to and in fluid communication with the first port G and is instead restricted by the first throttling member 37a. As the primary compressor 26 continues to run, the temperature and pressure of the refrigerant within the RTA heat exchanger 30a begins to rise. Cabin air from the vehicle interior 16 is drawn into the heat exchanger unit 30 and heated air is exhausted back into the interior 16. The first throttling member 37a at second port F of the exterior heat exchanger 28 restricts the refrigerant flow causing the exterior heat exchanger 28 to function as an evaporator. As the refrigerant passes through the exterior heat exchanger 28, it absorbs heat from the environment and eventually exits through the first port E of the exterior heat exchanger 28. The refrigerant then travels back to the reversible flow valve 32, entering through the second port B, exiting through the fourth port D and returning to the accumulator 34.

The primary compressor 26, as illustrated in FIG. 3, is driven by the engine or prime mover 18 of the vehicle 12. The primary compressor 26 may be either belt driven or directly coupled to a rotating shaft of the engine 18. Typically, an electrical clutch 38 is implemented to engage and disengage the primary compressor 26 from the engine 18. An electrical pulse may be generated from the instrument panel within the cabin 16 or from the vehicle environment controller 35 within the vehicle 12 to properly actuate or disconnect the primary compressor 26. During operation, if the suction side of the primary compressor 26 reaches a predetermined low pressure, the compressor will be stopped by the elimination of electrical power and/or decoupling from the engine 18. The stopping of the primary compressor 26 will also occur if a predetermined high pressure is reached at the discharge port PD of the compressor.

With continued reference to FIG. 2, another embodiment of a vehicle cabin heating and cooling system includes many of the same elements as previously described. However, either in addition to or in place of a primary compressor 26, an alternate or secondary compressor 39 may be used. The secondary compressor 39 is effectively connected in parallel with or in place of a primary compressor 26 via a secondary suction port SS and a secondary discharge port SD. The secondary compressor 39 is independent from the engine 18 and can therefore provide compressed refrigerant flow for heating and cooling of the vehicle 12 while the engine 18 is off. As shown in FIG. 2, the secondary compressor 39 is connected in parallel with the primary compressor 26 and the secondary compressor 39 is powered by direct current (DC) power supplied from one or more on board batteries. As described with the primary compressor 26, the independent secondary compressor 39 may be a fixed displacement compressor or a variable displacement type. The ability to adjust the volume of refrigerant flow without shutting off the compressor reduces inrush current requirements on the electrical supply. And is more efficient by matching the power demand of the compressor to the actual load. The compressor can be a variable speed, bypass or a digital scroll design.

In addition, a local power grid, external generator, or other alternating current (AC) source can be used for extended operation of the VIHCV system. This may be accomplished through the use of an inverter or NATO slave cable. In this manner, the separate and independent secondary compressor 39 provides for operating the heating and cooling system, without producing any audible or visible signs of the vehicle 12 running. In other words, the vehicle can be manned in a silent mode for surveillance purposes or the like. When external power is provided to the VIHCV system, it can continuously provide climate control of the vehicle interior. There are several advantages to having the capability of operating on external power. For example, less fuel is consumed and the interior can be pre-heated or pre-cooled before use. In addition, the vehicle can remain stationary (with the engine off) for indefinite periods of time while occupants or personnel of the vehicle can comfortably remain inside while carrying on various tasks (e.g., operating radios, computers, or other equipment).

As in the previous embodiments, the primary compressor or secondary compressor may be actuated via the controller 35 of the system, a thermostat or an instrument panel switch. In either case, the compressor may be commanded to run until the desired temperature is reached within the interior 16. The secondary compressor 39 may be used in conjunction with or in place of the primary compressor 26 to cause the refrigerant to compress more quickly, thus providing for a greater heat capacity (i.e. BTUs/hr).

With continued reference to FIG. 2, in yet another embodiment, the VIHCV system uses an auxiliary heating unit (AHU) 40. The AHU 40 is intended to operate in very low outdoor temperature environments when engine 18 is idling, off, or is otherwise incapable of producing enough heat for the VIHCV system. The AHU 40 produces heated water using a heater 40a to augment the heat from the engine water coolant. When operating the VIHCV system with the engine off, the AHU 40 may provide all of the heated water to a water-to-refrigerant (WTR) heat exchanger 42. The WTR heat exchanger 42 can be a heat exchanger having refrigerant flowing through one side of the heat exchanger (between a port I and a port J) and water flowing through the other side of the heat exchanger (as between ports L and N). The heat exchanger 42 can be a shell-in-tube, coaxial, brazed plate or any state of the art refrigerant heat exchanger. The AHU may include a port K for receiving engine water coolant and a port L which serves as a heated water outlet. In one mode of operation, the AHU receives engine water coolant from a port M during the heating control schemes depicted in FIGS. 4C and 4D. The coolant eventually travels in through port K to absorb heat from the heater 40a, out port L and into the WTR heat exchanger 42. Simultaneously, refrigerant flows into port I at a low pressure and expands adsorbing heat from the engine coolant/water. Heated refrigerant then exits port J, settles in the accumulator 34, and is again drawn out by the secondary compressor 39 and/or the primary compressor 26. Thereafter, the compressed refrigerant travels via the reversing valve 32 to port H of the interior RTA heat exchanger 30a. During this process, the engine/water coolant in the WTR heat exchanger 42 is circulated through the WTA heat exchanger 30b, where any residual heat is extracted into the interior cabin and eventually returned back into the engine water cooling system through port N or, depending on the conditions, recirculated into the AHU via port K based on the position at water solenoid valve 43.

Still with reference to FIG. 2, the heater 40a may be designed to heat the water surrounding the refrigerant line within the WTR heat exchanger 42 or heat the refrigerant lines directly. This may be accomplished by using a fuel burner for the heater 40a that may consume either propane, CNG, kerosene, diesel, gasoline or any other combustible fuel source, to generate a heat source within the AHU for heating the refrigerant. The heater 40a may even include an electrical resistance type element for heating the refrigerant. In either case, when the AHU 40 is operating, refrigerant is diverted away from the exterior heat exchanger 28 and towards the WTR heat exchanger 42/AHU 40. This is accomplished by closing a first valve 44 and opening a second valve 46. In addition, the third throttling member 37c may be located adjacent to and in communication with port I of the WTR heat exchanger 42/AHU 40 to provide the maximum amount of heat transfer between the gas or water heat source and the refrigerant within the system 10.

Now with reference to FIG. 3A, the VIHCV system 10 is shown in the cooling mode with the engine 18 running. As indicated by the highlighting and the modified line types of the refrigerant lines, the refrigerant is being pumped by the primary compressor 26 towards the exterior heat exchanger 28 where the refrigerant is condensed. Condensed refrigerant travels to the second throttling member 37b adjacent to the primary interior heat exchanger unit 30 where the refrigerant is then allowed to evaporate into the RTA heat exchanger 30a. The refrigerant then flows back to the reversible valve 32 and back into the primary suction port PS of the primary compressor 26.

By comparison, FIG. 3B illustrates the VIHCV system 10 operating in the cooling mode while the engine 18 is off. In this case, the operation of the cooling system is identical to the operation as discussed with reference to FIG. 3A. However, now the secondary compressor 39 is operating in place of the primary compressor 26. As discussed previously, the secondary compressor 39 is electrically driven and may be operated by a variety of internal or external electrical power sources.

Figure 4D:
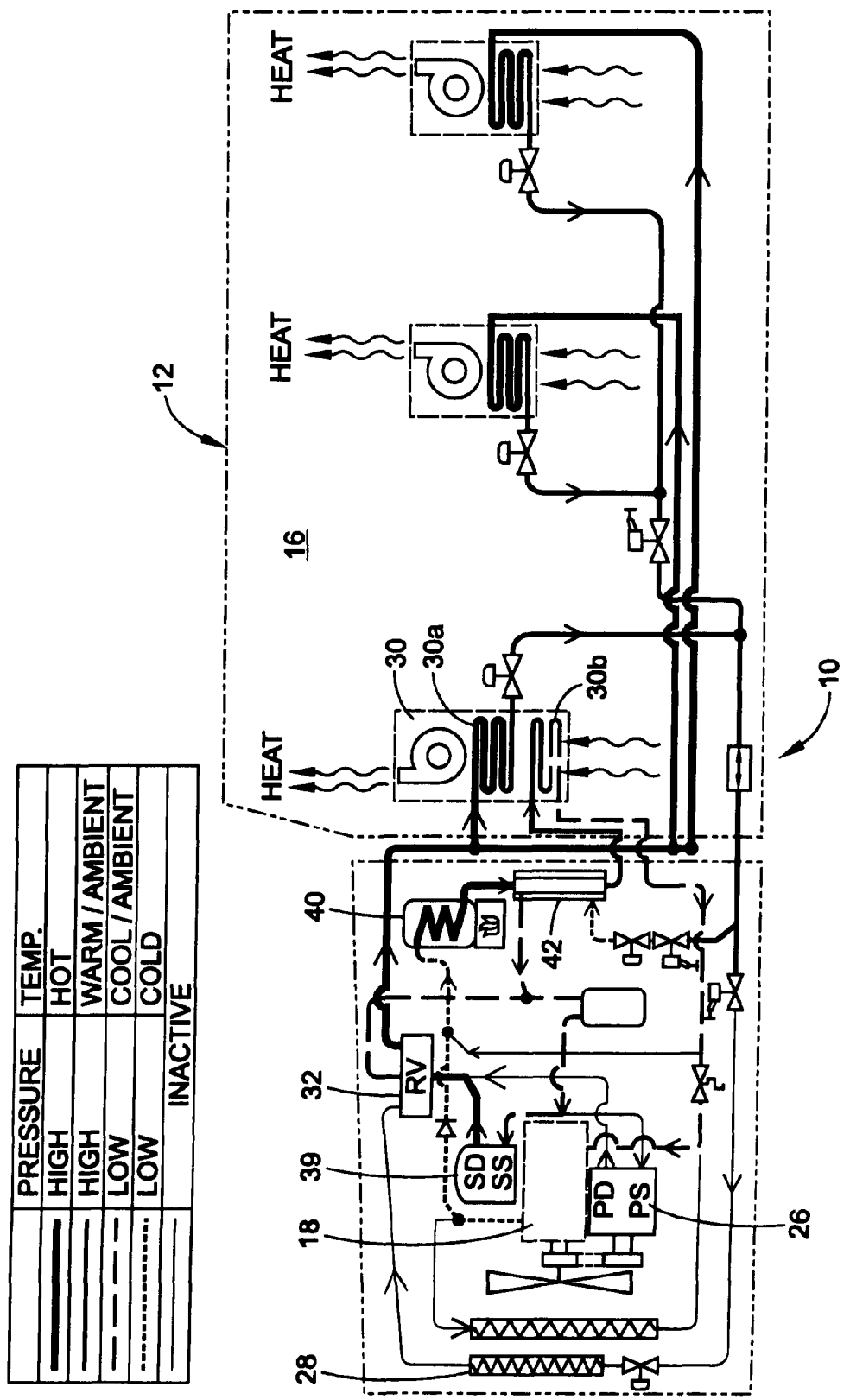
FIG. 4D is a schematic view of FIG. 1 illustrating the VIHCV system operating in the heating mode with the vehicle engine off.

Now with reference to FIGS. 4A-4D, the VIHCV system 10 illustrates various operating scenarios while operating in the heating mode. For example, FIG. 4A illustrates the system 10 producing heat in the interior 16 of the vehicle 12, while the engine 18 is running and while the exterior ambient conditions are greater than 40° F. In this particular scenario, the engine driven primary compressor 26 delivers refrigerant to be condensed in the RTA heat exchanger 30a. Eventually, the refrigerant passes through the second throttling 37b member and the refrigerant passes to the exterior heat exchanger 28, where heat transfer occurs between the refrigerant and the ambient outdoor environment. This scenario optimizes the efficiency of the heating system but, depending on the insulation characteristics of the vehicle 12, may only produce enough heat when the ambient conditions are greater than 40° F. or during prolonged engine idling conditions.

When ambient temperatures fall below 40° F., an additional heat source may be required to supplement the heat capacity of the system 10, particularly if the engine 18 is cold. This scenario is illustrated by FIG. 4B. In this case, the alternate heating unit (AHU) 40 provides the supplemental heat. Heat is initially transferred from the alternate heating unit to a closed loop water system which circulates between the AHU 40 through the WTR heat exchanger 42. The water eventually flows into the WTA heat exchanger 30b and finally returns back to the AHU 40. The WTR heat exchanger 42 transfers the heat from the heated coolant water to the refrigerant flowing from the RTA heat exchanger 30a. This refrigerant then flows through the third throttling member 37c into the refrigerant side of the WTR heat exchanger 42 and finally returns to the suction line accumulator 34. The refrigerant is then drawn out of the accumulator 34 and into the suction port PS by the primary compressor 26. As indicated by the lack of shading in the exterior heat exchanger 28, there is no refrigerant flow through the exterior heat exchanger 28. In effect, the WTR heat exchanger 42 has replaced or circumvented the exterior heat exchanger 28. In order to put the system 10 into this operating scenario, the water temperature solenoid valve 43 and the refrigerant valve 44 must be closed, while the refrigerant valve 46 is permitted to open. The ability to circumvent the exterior heat exchanger 28 has at least two advantages. One is during the heat pump mode the exterior heat exchanger 28 does not need to be used to extract heat from the prevailing ambient air temperature that can become very inefficient as ambient temperatures become colder. The WTR heat exchanger 42 is used as the heat source and is not ambient air temperature dependent, and second if the exterior heat exchanger 28 would be used (as in current ambient air heat pump designs) the coil will have the tendency to sweat or condensate water due to its colder than ambient air temperature. Sweating or condensate in a vehicle application provides a wetting source which promotes road dust and debris accumulation in these areas. This accumulation can result in a paste or mud that will adhere to the coils of the heat exchangers, inhibit air flow, and reduce the performance of the heat exchanger.

Now with reference to FIG. 4C, an operating scenario similar to FIG. 4B is shown. However, the distinction is that the water temperature valve 43 is permitted to flow water coolant back to the engine 18, as well as to the alternate heating unit 40. This scenario may be effective either when the engine coolant exit temperature is less than 80° F., such that the alternate heating unit 40 will be activated in order to accelerate the warm up period of the engine 18. In addition, this scenario may exist when engine 18 has reached its operating temperature and can now augment the heating capacity of the AHU 40, the WTR heat exchanger 42, and/or the interior RTA heat exchanger 30a.

With reference to FIG. 4D, a heating mode scenario is shown with the engine 18 in the off state. In this case, engine coolant water is circulated from the engine to the AHU 40, through the WTR heat exchanger 42, through the WTA heat exchanger 30b and back to the engine 18. In addition, the secondary compressor 39 is operating since the engine driven primary compressor 26 is not. With the engine 18 off, the secondary compressor 39 can operate the air conditioning system in a "heat pump" mode, similar to a home heat pump. The difference is that instead of ambient air or geothermal coils serving as a source of heat, the auxiliary heating unit 40 will be the heat source. This scenario is most likely to be used under conditions where the engine is not running and where it is preferable to maintain the engine at a certain temperature, in the event a quick departure without engine hesitation or start up issues would be required.

Now with reference again to FIG. 1, the first embodiment may include a plurality of secondary heat exchanger units 48 within the interior 16 of the vehicle 12. Specifically, one secondary interior heat exchanger unit 48 is shown positioned toward the middle of the interior 16 and another secondary interior heat exchanger unit 48 is shown positioned towards the rear of the cabin 16. The secondary interior heat exchanger units 48 are integrated into the VIHCV system 10 in a similar manner as the primary interior heat exchanger unit 30. In fact, only three connections are necessary to fully integrate the secondary interior heat exchangers 48 into the VIHCV system 10. These connections are indicated by reference signs O, P and Q as shown on FIGS. 1-2. In addition, the secondary interior heat exchanger units 48 may be selectively integrated into the VIHCV system 10 by simply actuating a third valve 50. When the third valve 50 is actuated, refrigerant is allowed to flow through the third valve 50, either to the heat exchangers 48 (as during cooling), or from the heat exchangers 48 (as during heating). The heat exchangers 48 also include two ports each. As before, a throttling member is connected adjacent each secondary heat exchanger unit 48 to extract the maximum amount of heat from the cabin as required. It should also be noted that in addition to or in place of the secondary heat exchanger units 48 personal cooling and heating vests may be worn by the occupants of the vehicle 12. These cooling vests may include connections for allowing them to be selectively integrated with the remainder of the VIHCV system 10. The connections points for the cooling vests would be similar to the connections O, P, and Q as shown in FIGS. 1 and 2.

It should be noted that several combinations of different fluid type heat exchangers could be used in the VIHCV system. For example, the primary or secondary interior heat exchanger units may only include a water-to-air heat exchanger or only a refrigerant-to-air exchanger, or both. It should also be noted that any combination of compressors may be used to compress the refrigerant during heating or cooling. In other words, the primary compressor and secondary compressor may work in tandem, or independently from one another. In particular, as to heating, the alternate heating unit (AHU) may operate independently or in combination with either one or both of the primary and secondary compressors. In addition, the AHU may heat the refrigerant directly using heated gas or via a secondary fluid such as engine coolant.

Lastly, FIG. 5 illustrates the Nuclear, Biological, and Chemical (NBC) filtration system 25 provided in the VIHCV system. The filtration system 25 generally includes a damper 52, an NBC filter assembly 56, a blower 60, and a pre-filter 62. The system 25 provides filtered pressurized airflow to the interior of the vehicle. During filtered pressurized airflow, the vehicle would be considered in a collective protection configuration. The primary interior heat exchanger unit 30 communicates with the airflow of the NBC filtration system 25. Airflow from 25 is introduced directly into the heat exchangers of the primary interior heat exchanger unit 30 providing the highest delta temperature to coils 30a and 30b.

Some NBC protection applications may necessitate that the airflow from the filtration system 25 be discharged directly into the crew compartment or cabin due to other vehicle component space issues, in this case a pre-filter heat exchanger 57 can be placed prior to or integrated within the housing of the NBC filter 56. The pre-filter heat exchanger 57 may be incorporated when optimum chemical filtration is required. The pre-filter heat exchanger 57 can be further used to control the temperature and/or the relative humidity level of the incoming unfiltered air prior to the NBC filter assembly 56. Non-NBC filtered outside airflow can be turned on or off and is controlled by a damper door 52 or other simple means. Naturally, placing the damper 52 in an open or non-NBC filtered position will extend the life of the filter 56. During collective protection or NBC filtration, damper 52 is closed. In addition, the damper 52 is located downstream of the filtration blower 60 such that if a leak exists in the damper 52, clean filtered air will leak to the outside. The outside air can be filtered by an NBC filter assembly 56 to different levels of protection depending upon the threat level of vehicle operation by the use of different NBC or filter types.

The filter assembly 56 can be one larger filter, a package of individual smaller filters or be separate filters housed within a protective sleeve or shell 58. The NBC filter assembly 56 can comprise of a gas phase and particulate filter as one unit or the gas phase filter can be separate from the particulate filter to provide better integration within the vehicle 10 (FIG. 1). In addition, the filters of the NBC filter assembly 56 may be of the regenerative type such that the filters can be heated (using refrigerant or engine coolant of the VIHCV system) and reverse blown to expel trapped contaminants, thus, restoring/extending filter capability/life. When individual gas phase filters are required for space savings the filters are housed inside the protective sleeve 58. The protective sleeve may be one or more metal tubes designed to hold a gas phase filter and or particulate filter. The tubes can be located in areas of the vehicle that are armor protected, but provide enough open area to mount the filter tubes without loss of cargo or crew space. The ability to use different sizes and shapes of filters will facilitate ease of installation, provide the highest level of gas and particulate protection, while protected inside the vehicle and/or by armor. Filter assembly 56 and filtration blower 60 are protected from ingestion of sand and dust by a self-cleaning pre filter 62. The self-cleaning pre filter 62 can be a sand trap consisting of metal baffles or a high efficiency mechanical or non mechanical cyclonic separator.

During collective protection mode or NBC operation, the interior and filtration system 25 provide for a slightly higher pressure inside the cabin as compared to outside the cabin. This slight positive cabin pressure ensures that contaminants, toxins, or chemicals will not enter the cabin via small openings or leaks within the interior of the vehicle. When the filtration system 25 is operating, the vehicle environment controller 35 (FIG. 2) can also monitor the specific cubic feet per minute (SCFM) flow rate of the air through the filters 56 as well as cabin air pressure to ensure the best flow velocity through the filter.

Several exemplary embodiments have thus been described. Modifications and alterations may occur to others upon reading and understanding the preceding detailed description. It is intended that the exemplary embodiments be construed as including all such modifications and alterations insofar as they come within the scope of the appended claims or the equivalents thereof.

The invention claimed is:

1. A heating, cooling, and ventilation system for an associated vehicle, the associated vehicle including a body and an engine, the body including a cabin defining an interior portion of the associated vehicle, the system comprising:

a first refrigerant compressor selectively coupled to a shaft of the engine of the associated vehicle, the first compressor including an inlet and an outlet;

a second refrigerant compressor selectively connected to an electrical power source of the associated vehicle, the second compressor including an inlet and an outlet;

a first refrigerant-to-air heat exchanger (RTAX) in fluid communication with air in the interior portion of the associated vehicle;

a second RTAX secured to the body of the associated vehicle and in fluid communication with air exterior to the cabin of the associated vehicle;

a valve member including a cooling position and heating position, the valve member operatively connecting the inlets of the first and second compressors to a refrigerant outlet of the first RTAX while connecting the outlets of the first and second compressors to a refrigerant inlet of the second RTAX when the valve member is in the cooling position, the valve member operatively connecting the outlets of the first and second compressors to a refrigerant inlet of the first RTAX while connecting the inlets of the first and second compressors to a refrigerant outlet of the second RTAX when the valve member is in the heating position;

a blower mounted to the associated vehicle and configured to move air through the first RTAX;

a nuclear-biological-chemical (NBC) filtration unit secured to the associated vehicle and in fluid communication with air exterior to the cabin of the associated vehicle; and a controller capable of selectively activating one or more of the first compressor and the second compressor while placing the valve member into one of the cooling position and the heating position, based upon one or more system inputs.

2. The system of claim 1, wherein the system inputs include one or more of an input from an ambient temperature sensor, an input from a cabin interior temperature sensor, a target interior cabin temperature, and an input from an engine coolant temperature sensor.

3. The system of claim 1, wherein the first compressor or the second compressor include a variable displacement, scroll bypass, or digital scroll compression chamber.

4. The system of claim 3, wherein the controller is capable of varying a displacement of the compression chamber of the first compressor or the second compressor.

5. The system of claim 1, wherein the blower includes a first inlet for receiving an exterior ambient air flow and a second inlet for receiving an interior cabin air flow.

6. The system of claim 1, wherein an outlet of the NBC filtration unit is in fluid communication with an inlet of the blower.

7. The system of claim 1, wherein the NBC filtration unit includes a pre-filter heat exchanger.

8. The system of claim 1, wherein the NBC filtration unit includes a reverse airflow regenerative filter.

9. A heating, cooling, and ventilation system for an associated vehicle, the associated vehicle including a body and an engine, the body including a cabin defining an interior portion of the associated vehicle, the system comprising:

a first refrigerant compressor selectively coupled to a shaft of the engine of he associated vehicle, the first compressor including an inlet and an outlet;

a second refrigerant compressor selectively connected to an electrical power source of the associated vehicle, the second compressor including an inlet and an outlet;

a first refrigerant-to-air heat exchanger (RTAX) in fluid communication with air in the interior portion of the associated vehicle;

a second RTAX secured to the body of the associated vehicle and in fluid communication with air exterior to the cabin of the associated vehicle;

a valve member including a cooling position and heating position, the valve member operatively connecting the inlets of the first and second compressors to a refrigerant outlet of the first RTAX while connecting the outlets of the first and second compressors to a refrigerant inlet of the second RTAX when the valve member is in the cooling position, the valve member operatively connecting the outlets of the first and second compressors to a refrigerant inlet of the first RTAX while connecting the inlets of the first and second compressors to a refrigerant outlet of the second RTAX when the valve member is in the heating position;

a blower mounted to the associated vehicle and configured to move air through the first RTAX;

a water-to-refrigerant heat exchanger (WTRX) having a refrigerant portion and an engine coolant portion, the refrigerant portion of the WTRX being in selective fluid communication with one or more of the inlet of the first compressor, the inlet of the second compressor, and the refrigerant outlet of the first RTAX, the engine coolant portion of the WTRX being in selective fluid communication with an engine coolant circuit of the engine; and a controller capable of selectively activating one or more of the first compressor and the second compressor while placing the valve member into one of the cooling position and the heating position, based upon one or more system inputs.

10. The system of claim 9, wherein the controller is capable of placing the WTRX into fluid communication with the first RTAX and the engine coolant circuit when an ambient temperature is below a first threshold.

11. The system of claim 9, further including an auxiliary heating unit (AHU) in fluid communication with one or more of the engine coolant circuit and the WTRX.

12. The system of claim 11, wherein the controller is capable of activating the AHU thereby providing heat to one or more of the engine coolant circuit and the WTRX when an ambient temperature is below a second threshold.

13. The system of claim 9, wherein the system inputs include one or more of an input from an ambient temperature sensor, an input from a cabin interior temperature sensor, a target interior cabin temperature, and an input from an engine coolant temperature sensor.

14. The system of claim 9, wherein the first compressor or the second compressor include a variable displacement, scroll bypass, or digital scroll compression chamber.

15. The system of claim 14, wherein the controller is capable of varying a displacement of the compression chamber of the first compressor or the second compressor.

16. The system of claim 9, wherein the blower includes a first inlet for receiving an exterior ambient air flow and a second inlet for receiving an interior cabin air flow.

17. The system of claim 9, further including a nuclear-biological-chemical (NBC) filtration unit secured to the associated vehicle and in fluid communication with air exterior to the cabin of the associated vehicle.

18. The system of claim 17, wherein an outlet of the NBC filtration unit is in fluid communication with an inlet of the blower.

19. The system of claim 17, wherein the NBC filtration unit includes a pre-filter heat exchanger.

20. The system of claim 17, wherein the NBC filtration unit includes a reverse airflow regenerative filter.

21. The system of claim 1, further including a water-to-refrigerant heat exchanger (WTRX) having a refrigerant portion and an engine coolant portion, the refrigerant portion of the WTRX being in selective fluid communication with one or more of the inlet of the first compressor, the inlet of the second compressor, and the refrigerant outlet of the first RTAX, the engine coolant portion of the WTRX being in selective fluid communication with an engine coolant circuit of the engine.

22. The system of claim 21, wherein the controller is capable of placing the WTRX into fluid communication with the first RTAX and the engine coolant circuit when an ambient temperature is below a first threshold.

23. The system of claim 21, further including an auxiliary heating unit (AHU) in fluid communication with one or more of the engine coolant circuit and the WTRX.

24. The system of claim 23, wherein the controller is capable of activating the AHU thereby providing heat to one or more of the engine coolant circuit and the WTRX when an ambient temperature is below a second threshold.

* * * * *